(12) United States Patent
Schulz et al.

(10) Patent No.: US 8,800,845 B2
(45) Date of Patent: Aug. 12, 2014

(54) DEVICE FOR TRANSVERSE SEAM WELDING

(71) Applicant: Nexans, Paris (FR)

(72) Inventors: Holger Schulz, Hannover (DE); Ralf Egerer, Seesen (DE); Wilhelm Kutzbach, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/678,643

(22) Filed: Nov. 16, 2012

(65) Prior Publication Data

US 2013/0313308 A1 Nov. 28, 2013

(30) Foreign Application Priority Data

Nov. 17, 2011 (EP) ..................................... 11306506

(51) Int. Cl.
*B23K 37/04* (2006.01)

(52) U.S. Cl.
USPC ........................... 228/44.3; 228/49.1; 228/49.4

(58) Field of Classification Search
None
See application file for complete search history.

(56) References Cited

U.S. PATENT DOCUMENTS

| | | | | |
|---|---|---|---|---|
| 2,120,316 A * | 6/1938 | Stone | ............................. | 228/5.7 |
| 2,143,969 A * | 1/1939 | Biggert, Jr | ..................... | 228/125 |
| 2,649,528 A | 8/1953 | Koenig et al. | | |
| 2,911,515 A * | 11/1959 | Cooper | ........................... | 228/5.7 |
| 3,386,640 A * | 6/1968 | Booher | ........................... | 228/5.7 |
| 3,403,833 A * | 10/1968 | Wheeler et al. | ................. | 228/5.7 |
| 3,458,103 A * | 7/1969 | Davis | ............................. | 228/5.7 |
| 3,915,368 A * | 10/1975 | Ulmer | ............................ | 228/13 |
| 4,063,061 A * | 12/1977 | Fujino et al. | ................... | 219/101 |
| 4,096,375 A * | 6/1978 | Fujino et al. | ..................... | 219/97 |
| 4,286,744 A * | 9/1981 | Gullotti et al. | ................ | 228/125 |
| 4,304,977 A * | 12/1981 | Hanai et al. | ..................... | 219/97 |
| 4,626,651 A * | 12/1986 | Taniguchi et al. | ........ | 219/121.63 |
| 4,721,241 A * | 1/1988 | Yuasa et al. | ..................... | 228/5.7 |
| 5,169,051 A * | 12/1992 | Noe | ................................. | 228/5.7 |
| 5,172,846 A * | 12/1992 | Hayashi et al. | ................ | 228/5.7 |
| 5,456,405 A | 10/1995 | Stagg | | |
| 5,605,275 A * | 2/1997 | Rintala | ......................... | 228/49.4 |
| 5,674,412 A * | 10/1997 | Ege et al. | ................... | 219/85.15 |
| 5,948,295 A * | 9/1999 | Perret et al. | ................. | 219/125.1 |
| 5,992,726 A * | 11/1999 | Shaffer | ........................... | 228/5.7 |
| 6,213,381 B1 * | 4/2001 | Funamoto et al. | .......... | 228/141.1 |
| 6,244,494 B1 * | 6/2001 | Shaffer | ............................ | 228/5.7 |
| 6,518,535 B2 * | 2/2003 | Yoneya et al. | ................... | 219/82 |

(Continued)

FOREIGN PATENT DOCUMENTS

| | | | |
|---|---|---|---|
| DE | 3809713 A | * | 4/1989 |
| JP | 5057477 | | 3/1993 |
| WO | 2010052339 | | 5/2010 |

OTHER PUBLICATIONS

International Search Report dated May 9, 2012.

*Primary Examiner* — Kiley Stoner
(74) *Attorney, Agent, or Firm* — Sofer & Haroun, LLP

(57) ABSTRACT

A device and a method for the positionally accurate arrangement of two material ends located opposite each other. The device includes two carriers with always one fixing device for each material end, wherein at least one of the two carriers is slidably guided relative to the second of the carriers, and at least the first carrier has a first adjusting member and a second adjusting member connected to the first adjusting member, wherein the adjusting members form a drive by means of which the first carrier is slidable against the second carrier.

15 Claims, 7 Drawing Sheets

(56) References Cited

U.S. PATENT DOCUMENTS

| | | | |
|---|---|---|---|
| 6,572,003 B2 * | 6/2003 | Miyata et al. | 228/49.1 |
| 8,003,914 B2 * | 8/2011 | Nishio et al. | 219/121.63 |
| 8,011,556 B2 * | 9/2011 | Behrens et al. | 228/4.1 |
| 2002/0011469 A1 * | 1/2002 | Miyata et al. | 219/82 |
| 2009/0084828 A1 * | 4/2009 | Sohl et al. | 228/44.3 |

\* cited by examiner

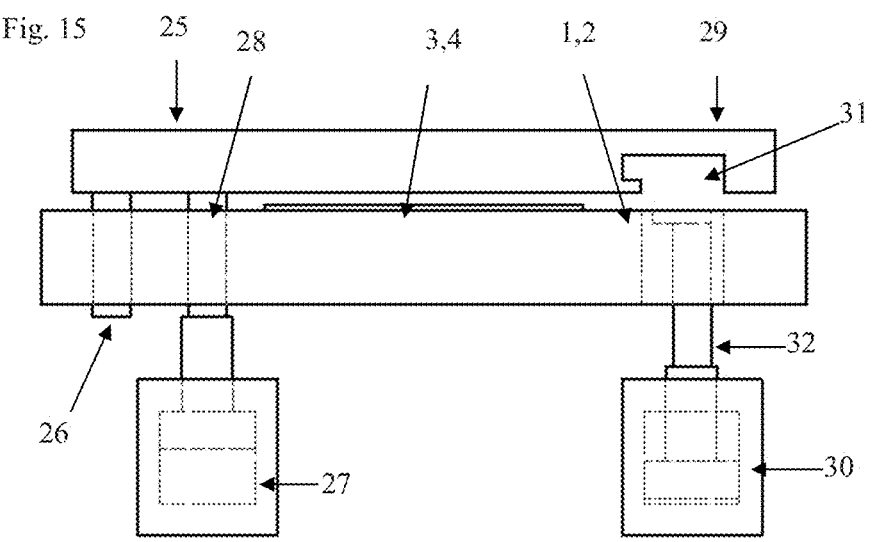
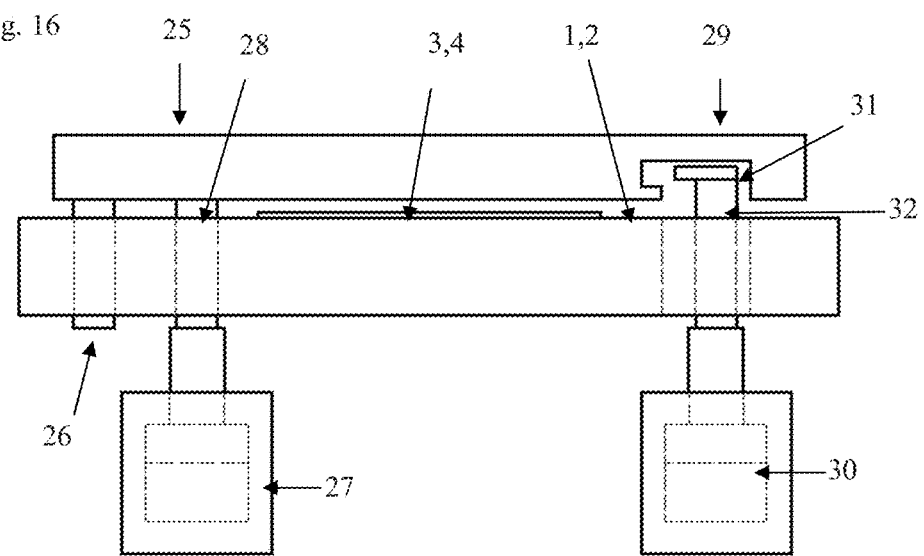

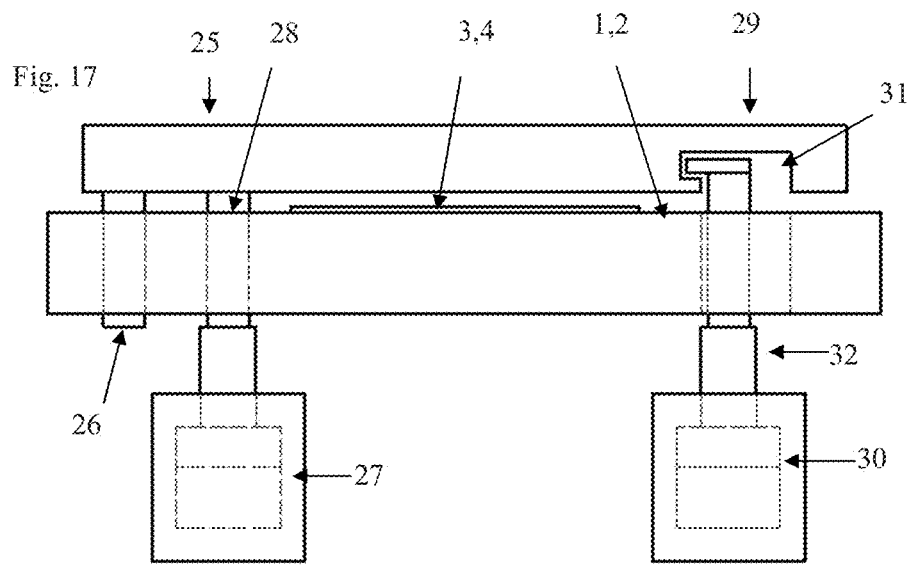
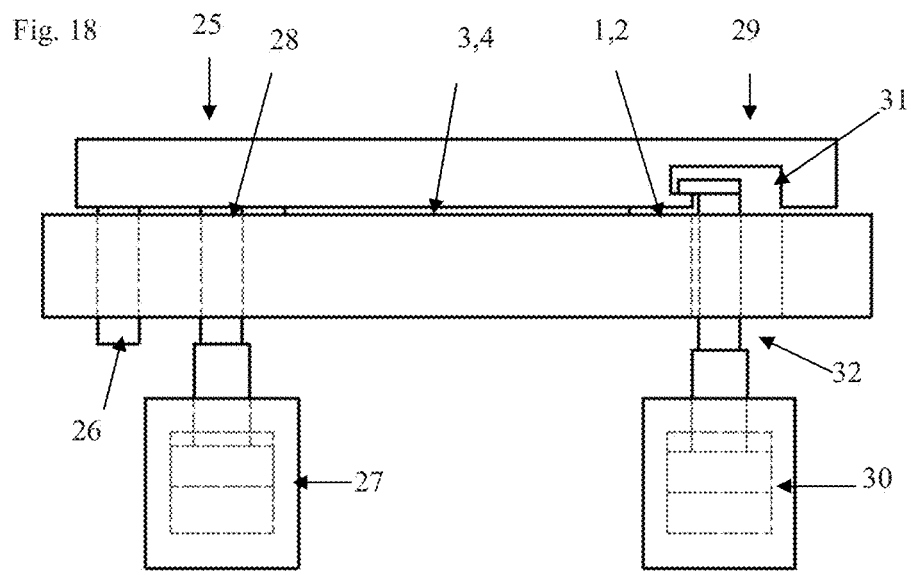

DEVICE FOR TRANSVERSE SEAM WELDING

RELATED APPLICATION

This application claims the benefit off priority from European Patent Application No. 11 306 506.4, filed, on Nov. 17, 2011, the entirety of which is incorporated by reference.

BACKGROUND

1. Field of the Invention:

The present invention relates to a device for positioning two material ends, or for joining two material ends positionally accurately in the correct position, which are connected in a transverse seam welding machine by means of a welding device; a transverse seam welding machine with the device for positioning; and a method for welding two abutting material ends using the step of joining two material ends together in a correct position, prior to welding.

2. Description of Related Art:

U.S. Pat. No. 2,649,528 describes a welding machine in which two ends of copper strands are fixed at a distance, and a crucible with a recess can be positioned underneath the distance by means of adjusting screws so that an auxiliary welding substance, which is supposed to fill the distance between the copper strands, is received and held by the recess of the crucible.

U.S. Pat. No. 5,456,405 describes welding of sheet metal strips in the continuous manufacture of a metal pipe by cutting the ends of the sheet metal strips facing each other at an angle toward the longitudinal axis and with an inclination toward the cross sectional plane, welding of the oppositely located ends and removal of the protruding material in the welding seam, wherein the welding seam is extended beyond the longitudinal edges during welding by means of sheet metal pieces attached to the sheet metal strips.

OBJECTS AND SUMMARY OF THE INVENTION

It is the object of the invention to provide an alternative device and an alternative method which can be carried out by the device for connecting end faces of two metal strips.

The invention meets the object with a device and a method according to the Claims, particularly with a device and a method for the positionally accurate arrangement of two oppositely located material ends relative to each other, particularly with a predetermined force. The device according to the invention permits precise positioning of two oppositely located material ends with their end faces against each other, wherein the force, by means of which the end faces are moved relative to each other or against each other, can be predetermined. The device includes two carriers with a fixing device each for always one material end, wherein at least a first of the two carriers is guided to be slidable relative to the second carrier, and at least the first carrier has a first adjusting member and a second adjusting member connected to the first adjusting member, which form a drive by means of which the first carrier is movable relative to the second carrier. Preferably, a sliding element, a connecting element and the carrier attached to the latter, form a rigid frame which is preferably connected to the loose end of a first adjusting member, wherein this loose end is fastened, for example, to the sliding element. Preferably, at least the first carrier is guided on guiding rails or guiding rods. For positioning, at least one of the carriers may have a position sensor which preferably is connected to a control unit for the first and/or second adjusting member. Preferably, the position sensor is arranged between an adjustable part of the second adjusting member which, for example, is a part connected to the loose end or its fixed end, and the sliding element or base frame. Particularly preferred is the sensor for determining the positioning of the parts of the second adjusting member relative to each other, so that, for example, the position of the adjustable part of the second adjusting member can be adjusted in a controlled manner under the control of the sensor, in order to permit a controlled positioning of the parts of the second adjusting member relative to each other, and/or a controlled actuation of the second adjusting member. Alternatively or additionally, the device may include a force sensor which is set up for measuring the force acting between the carriers, wherein preferably the force sensor is connected to a control unit. The control unit is set up for controlling the first and/or the second adjusting member on the basis of the signal of a position sensor and/or a force sensor, particularly for operation by means of a sensor until a predetermined position of a carrier or of the carriers relative to each other and/or a predetermined force is determined between the carriers. The position of the carriers, in which the oppositely located material ends are arranged relative to each other and welded, is also called the welding position. A second adjusting member, which includes a sliding wedge, preferably includes as a sensor for determining the position of the carrier, wherein the sensor determines the position of the sliding wedge.

Preferably, the device includes a cutting device which is movable, for example, between the carriers and which cuts material ends into end faces which are fitted to each other when carrying out the method, particularly parallel end faces. The position in which the carriers are spaced apart for positioning the cutting device at the material ends and particularly for moving the cutting device between the carriers is also called the cutting position.

Generally, the unit of the device, for example, for carrying out method steps, also describes the corresponding steps of the method, and the description of method steps describes the unit of the device for these method steps.

The device and the method for connecting two material ends by welding them together, particularly for the use of welding the end faces of thin sheet metal, for example, for sheet metal having a thickness of <1 mm, for example, <0.5, more preferred <0.3 mm, particularly with a thickness of <0.2 mm, <0.1 mm, or <0.05 mm. This is because the interaction of the first and second adjusting members leads, by controlling the first and/or the second adjusting member, to a positionally accurate positioning of the end faces of the material ends relative to each other, particularly until a predetermined distance between the material ends or between the first and second carriers is reached, preferably until a predetermined force between the carriers or material ends fixed to the carriers located opposite each other, is reached. Preferably, the end faces extend parallel to each other. Preferably, the distance between the carriers and/or the force, which acts between the carriers, is measured with a distance sensor or a force sensor, wherein a control unit controls the first and/or second adjusting member in dependence on the signal of the sensor.

The second carrier can be fixed so as to be stationary or may be slidably guided relative to the first carrier, particularly with a drive which includes a first adjusting member, or a first adjusting member and a second adjusting member connected to the first or consists thereof. Therefore, the description of the drive refers, with reference to the first carrier, also to the configuration of the second carrier in its embodiments, which include a drive which has a first adjusting member, or a first adjusting member and a second adjusting member connected to the first adjusting member, or consists thereof.

The first adjusting member serves for the movement of the first carrier relative to the second carrier, for example, in the direction toward the second carrier, or away from the second carrier, for the course positioning of the first carrier relative to the second carrier, while the second adjusting member serves for the more precise positioning of the first carrier relative to the second carrier. Correspondingly, the first adjusting member and/or the second adjusting member are independent, for example, a hydraulic or pneumatic adjusting cylinder, a first spindle drive, toothed rack drive, a cam drive, a curved disc drive or an eccenter drive, a driven toggle lever, a driven linear axis, a gear drive or toothed belt drive. The second adjusting member may be, for example, a spindle drive or a wedge-type drive with two wedges, wherein one of the drives is slidable at an angle to the direction of movement of the first carrier, particularly perpendicular to the first carrier.

The first carrier may be displaceable relative to a base frame along a guide. The second carrier may be connected to the base frame so as to be stationary and may be guided by means of a first adjusting member arranged between the base frame and the second carrier so as to be slidable relative to the first carrier, or, corresponding to the first carrier, by means of a first adjusting member which supports a second adjusting member, so as to be slidable toward the first carrier relative to the base frame.

The carriers each have a fixing device for fixing always one section of a material, wherein preferably the end of the material protrudes over a carrier in the direction toward the other carrier. For fixing the material, which is particularly strip shaped and preferably flat, especially a sheet metal strip, each carrier has a plane surface against which the material is arranged. This plane surface may optionally be part of the fixing device. Preferably, the fixing device has another plane surface movable against the plane surface of a carrier and forms on, or with, the carrier two spaced apart plane surfaces which are movable relative to each other between which material, particularly a sheet metal strip, can be fixed.

Preferably, each carrier has a stop which is slidable parallel to the longitudinal axis of the guide along which the first carrier is slidable up to an acute angle relative to the longitudinal, axis of the guide and protrudes beyond a section of the surface of the carrier on which a material is arranged. The stops of each carrier are preferably arranged parallel to each other or at an acute angle relative to each other, for example 0° to 45°, preferably up to 30° or up to 18°, further preferred up to 15° and the end faces are arranged at an acute angle, for example, due to cutting in this angle relative to its cross section.

These stops are, in relation to the longitudinal axis of the guide along which the first carrier is slidable, arranged so as to be located opposite each other, so that the materials rest against the stops in relation to their longitudinal axis against oppositely located longitudinal edges. Preferably, the stops are arranged on a common side, so that the materials rest always with the same longitudinal edge against the stops in relation to their longitudinal axis. Preferably, the stops, particularly if they are arranged up to an angle relative to the longitudinal axis of the guide, along which the first carrier is slidable, are arranged with an offset relative to each other. Such an offset of the stops is particularly constructed in such a way that the end faces of the material ends are arranged after cutting so as to fit the carriers against each other by moving the carrier. Thus, the offset of the stops causes a compensation of the offset of the material ends which results from a distance of the carriers when the material ends project beyond the carriers. The offset of the stops, which results from the cutting width of the cutting device used for the cutting, the distance of the stops to the knife edge or the dimension by which the cut material ends protrude beyond the carriers, and possibly the cutting angle, is, for example, adjusted fittingly if the points of intersection of the straight line extending through the stops are located with the respectively adjacent edge of the cutting device on a straight line, which extends parallel to the direction of movement in which the first carrier is slidably guided relative to the second carrier. When arranging a cutting device, which has two parallel cutting edges, or produces two parallel spaced apart end faces of the material ends perpendicular to the direction of movement of the first carrier, the offset is fitting if the point of intersection of the straight line which extend through the stops, are arranged on a straight line which extends perpendicular to the cutting edge or perpendicular to the end faces.

The first adjusting member is connected with its fixed end to a base frame and with its loose end to the first carrier, so that the first carrier is movable by means of the first adjusting member relative to the base frame. The second carrier arranged in the direction of movement of the first adjusting member, for example, is fixed to the base frame, or is movable by means of a drive to a first adjusting member, or with a first and second adjusting member, relative to the base frame.

In a first embodiment, the first adjusting member and the second adjusting member act against each other because the carrier whose drive is formed by the first and second adjusting members includes a sliding element, or is connected to a sliding element, which is connected to the loose end of the first adjusting member and the loose end of the second adjusting member, in particular it is fastened in between the loose end of the first adjusting member and the loose end of the second adjusting member, while the fixed end of the first adjusting member and the fixed end of the second adjusting member are secured to the common base frame. In this embodiment, the second adjusting member forms a stop surface for the sliding element which limits the movement of the sliding element in the direction toward the second carrier. The second adjusting member has at least two parts, one of which forms the loose part connected to the loose end, and the other part forms the fixed part connected to the fixed end which act exclusively relative to each other by frictional engagement. The sliding element and the first carrier connected to the sliding element are moved by actuating the first adjusting member. The actuation of the first adjusting member causes, in one direction, a movement of the sliding element away from the second adjusting member, for example, during a state of operation in which the carriers are remote from each other, or when actuated in the opposite direction, cause a movement of the sliding element in the direction toward the fixed end of the second adjusting member until the loose part of the second adjusting member rests against the fixed part of the second adjusting member, for example, in a state of operation in which the carriers are positioned up to a predetermined minimum spacing.

An example for a second adjusting member which has at least two parts, namely a loose part and a fixed part, which are freely slidable relative to each other until frictional engagement has been reached, is a wedge adjustment with two wedges, one of which is connected to the loose end and the other is connected to the fixed end, which are slidable relative to each other along the wedge surfaces. Another example for a second adjusting member, which has two parts which are slidable relative to each other, one of which is connected to the loose end and the other connected to the fixed end, is an adjusting screw interacting with a stop surface, wherein one end of the adjusting screw rests against the stop surface and the other end of the adjusting screw is guided in a thread. In this embodiment, the stop surface forms one part and the adjusting screw, guided in the thread, forms the other part, wherein the parts can be moved apart from each other because the adjusting screw is not in engagement with the stop surface. A sensor is connected to the part of the second adjusting member which is slidable relative to the other part, for example, with that one of the wedges which is slidable relative to the base frame, or with the adjusting screw.

In the first embodiment, the configuration of the second adjusting member in two parts, which can be removed from each other, which are frictionally engaged relative to each other in a position of operation, permits spacing apart of the first carrier from the second carrier by actuating the first actuating member, while the fixed part connected to the fixed end of the second adjusting member forms a stop surface which limits the movement of the first carrier in the direction toward the second carrier.

Particularly in the first embodiment, the second adjusting member can be pre-adjusted in a certain position in which the distance between the loose end and the fixed end of the second adjusting member is fixed because the movement of the first carrier in the direction toward the second carrier is limited by means of the second adjusting member by a frictional engagement or by contacting its two parts against each other.

In the first embodiment of the method, the fixed end of the second adjusting member is connected to the base frame, and the loose end of the second adjusting member is connected to the loose end of the first adjusting member, wherein preferably a siding element, which is connected to the first carrier, is connected to the two loose ends of the first and second adjusting members. In this connection, the second adjusting member preferably has two parts, one of which is connected to the fixed end and the other is connected to the loose end, wherein both parts can be separated from each other, and can be separated from each other by movement of the first carrier in the direction of the fixed end of the first adjusting member, wherein preferably in this position the material ends protruding beyond the carrier are cut and subsequently by actuating the first adjusting member, the part of the second adjusting member connected to the loose end of the second adjusting member is moved toward its part connected to the fixed end until the first and second parts rest against, each other, particularly by frictional, engagement, wherein preferably in this position the oppositely located end faces of the first and second material ends rest against each other. Preferably, in this position, the carriers are positioned with a predetermined minimum spacing in which the carriers are in the welding position.

The first carrier and/or the sliding element are generally guided by means of a first guiding device, wherein preferably the first carrier and/or the sliding element are connected rigidly to the guiding device.

In a second embodiment, the second adjusting member is arranged between the loose end of the first adjusting member and the carrier, so that the first and second adjusting members act with each other or in the same direction between a fixed point connected to toe base frame and the first carrier. In this embodiment the connecting element can be omitted or can be arranged between the first and second adjusting members, for example, at the loose end of the first adjusting member and relative to the carrier at the second adjusting member, particularly connected to the loose part of the second adjusting member.

In the second embodiment, the first adjusting member is arranged between the base frame and the second adjusting member which is connected to the first carrier, or the first adjusting member is connected with its one end to the base frame and with its other end no the second adjusting member. The second adjusting member is arranged between the first adjusting member and the carrier, for example, by connecting its first end, which may be, for example, the loose end, with the first adjusting member and connecting the second end, which may be, for example, the fixed end, to the first carrier.

Preferably, the device has at the sliding element two first adjusting members which act parallel to the connecting element and/or parallel to the first adjusting member which produces guidance.

Preferably, the first and/or second adjusting members are controlled in each embodiment by a control device and the device includes a sensor which measures positioning of the parts of the second adjusting member, particularly positioning of the part of the second adjusting member which is movable relative to the base frame or which measures the position of the first carrier relative to the second carrier. The control device is, for this purpose, configured for controlling the first and/or second adjusting member in dependence on the signal of the sensor, which indicates the position of the first carrier relative to the second carrier. In particular, the control device is configured for moving the first and/or second adjusting member into a predetermined position relative to the second carrier, for example, until a predetermined distance of the first carrier from the second carrier is reached.

Further preferred, the sensor is a force sensor which is configured for measuring the force between the first carrier and the second carrier. In this embodiment, the control device is preferably configured for controlling the first and/or second adjusting members in dependence on the signal of the force sensor, until the first carrier is moved, against the second carrier, up to reaching a predetermined value for the force, which acts between the first and second carriers. In this connection, the device may be configured such that the material ends fixed on the carriers each protrude beyond the respective carrier to which they are fixed, and are moved relative to each other in a common plane until its end faces abut, so that a force sensor, which is configured for measuring the force between the first and the second carrier, which is determined to be the measure for the force which acts between the abutting end faces of the material ends and is used, for example, for controlling the first and/or second adjusting member.

In the first embodiment, the position of the second adjusting member of the first carrier, optionally additionally the position of the first adjusting member and/or the second adjusting member of the second carrier, can be set manually, particularly in a position in which, when the parts of the second adjusting member rest against each other, for example, in the case of frictional engagement of its two parts, the first carrier is in a position in which any material ends protruding beyond the carriers after cutting by means of the cutting device are arranged in a predetermined position and/or with a predetermined force relative to each other.

In a first embodiment, the control device may be configured for controlling the second adjusting member in a position in which, when the parts of the second adjusting member rest against each other, for example, in the case of a frictional engagement of its two parts, the first carrier is in a position in which any material ends protruding after cutting by means of the cutting device, are arranged with a predetermined force relative to each other, wherein the control device is configured for controlling by actuating the respectively first adjusting member, the first carrier, optionally additionally the second carrier, to move into a spaced apart position only by actuating the respectively first adjusting member, and, after fixing the materials to the carriers and cutting the material ends, the first carrier, for moving in the direction toward the second carrier, is controlled only by actuating the respectively first adjusting member.

Optionally, the device preferably includes a cutting device, which is configured for cutting materials fixed to the first and second carriers, particularly sheet metal strips whose material ends protrude beyond the carriers in the direction toward the oppositely located carrier, in particular for cutting parallel relative to each other. The cutting device may include a laser which is directed to the area between the first and second carriers. A preferred cutting device includes a cutting element which is movable adjacent a counter knife or between two counter knives, particularly slidable along a counter knife or between two counter knives, particularly linearly, or pivotably. Preferably, the device is configured for positioning the carriers in a cutting position in which the cutting device cuts the material, ends, and in which, for example, the cutting device is movable between the carriers. For positioning the first and/or second carriers in the cutting position, the device may include a control device which is configured for positioning the first and/or second carriers in a predetermined cutting position, and/or the device may include a stop surface for the first and/or second carriers which, upon whose contact the first and/or second carriers are positioned in the cutting position.

The device preferably includes a welding ledge which, after the material ends have been cut, preferably prior to or after displacement of the first carrier relative to the second carrier, especially up into a position in which the cut material ends abut each other, until being positioned adjacent to the plane, in which the carriers or the materials arranged on the carriers extend. A welding ledge has, for example, two placement surfaces which are aligned parallel to the plane of the carriers, and which between each other define a groove which is arranged parallel to the abutting material ends. A welding ledge reinforces the alignment of the material ends in a common plane and preferably serves for the removal of heat during welding. Protective gas can be supplied from below at the material ends. Correspondingly, the device optionally includes a supply unit for protective gas which, for example, ends in the groove of the welding ledge.

In embodiments which include the welding ledge, the fixing device of the first and/or second carriers may have an appendix with a surface which extends approximately parallel to the carriers and/or parallel to the placement surfaces of the welding ledge.

Further preferred, the welding ledge is attached to the cutting element so that the welding ledge, after the cutting element has been moved between the carriers for cutting the material ends, can be positioned between the carriers for cutting the material ends by moving the cutting elements, particularly adjacent the material ends. Optionally, in this embodiment, the welding ledge is mounted on the cutting element opposite the welding device and can be positioned by moving the cutting element adjacent the plane in which the carriers extend. Preferably, the cutting device is configured for cutting between the carriers which are positioned so as to be spaced apart in a cutting position, wherein, after cutting, the carriers are moved into their welding position and the cutting element is moved until the welding ledge is positioned adjacent to the plane in which the carrier or the material ends fixed to the carriers extend.

Particularly preferred, the device is configured for spacing further apart the first and/or second. carrier after cutting, further than they are spaced apart in the cutting position and subsequently the cutting device is moved between the carriers. In this manner, particularly when the cutting device includes knives, which after cutting rest against the cut end faces of the material ends, a mechanical load of the cut end faces is avoided.

The fixing device for each carrier preferably includes a clamping beam. Which has a planar clamping surface facing the planar surface of the carrier on which a material is arranged. A clamping beam may be pivotable relative to the carrier and/or may be slidably guided parallel relative toward the carrier. A clamping beam, which is hinged so as to be pivotable relative to the carrier or is slidably guided against the carrier, is preferably hinged or displaceably mounted on the carrier, preferably with its first end. The clamping beam may have at its first end. a first clamping drive, Which spaces the clamping beam away from the carrier or which acts on the carrier for a clamping position relative to the carrier.

The clamping beam is preferably slidably guided relative to the carrier at its second end which is spaced apart from the first end at least by the width of the material or by the width of the planar surface. For example, the clamping beam may, at its second end, be in engagement with a second clamping drive, or may be in releasable engagement therewith, or may be releasably locked thereto, wherein the second clamping drive is configured into a clamping position to bias the clamping beam in a clamping position against the carrier. Preferably, the first clamping drive is connected by means of a first rod to the first end of the clamping beam, wherein the first rod is guided perpendicularly to the planar surface of the carrier, for example, in a bore arranged perpendicularly of the plane of the carrier. The second clamping drive can be moved or locked by means of a second rod to the second end of the clamping beam, wherein further preferred, the second rod is arranged in a bore of the carrier which is situated parallel to the bore in which the first rod is arranged.

The method according to the invention for connecting two material ends, particularly by means of the device according to the invention, includes the following steps:

Preferably making available a device according to the invention,

Fixing a first material on a first carrier, so that the material end thereof protrudes beyond the first carrier, in the direction toward the first carrier, Fixing a second material on a second carrier, so that the material end of the second material projects beyond the second carrier in the direction toward the first carrier, wherein each fixing step is preferably effected by biasing a clamping beam against the carrier, particularly by biasing the clamping beam by means of a first clamping drive acting on its first end, and optionally additionally by means of a second clamping drive acting on its second end, wherein optionally the first protruding material end and the second protruding material end are intersected in end faces which are located, for example, at an acute angle relative to each other or preferably are parallel to each other, Particularly with positioning the carriers in a cutting position by moving a cutting device between the carriers and subsequently moving the cutting device out of the space between the carriers, preferably together with the step of removing the carriers from each other after cutting, before the cutting device is moved out of the space between the carriers, Guided movement of the first carrier, relative to the second carrier, until the end faces of the first and second material ends rest against each other, wherein their cross sections are congruent, By actuating a first adjusting member whose fixed end is connected to a base frame, and actuating a second adjusting member which is connected to a first adjusting member, Wherein the second carrier is connected stationary to the base frame or by a guided movement of the second carrier relative to the first carrier by means of another first adjusting member connected to the second carrier, wherein the fixed end of the first adjusting member is connected to the base frame, optionally additionally actuating a second adjusting member which is connected to this first adjusting member, Particularly until the end faces of the first and second material ends rest in predetermined positions against each other or are placed against each other with a predetermined force, Wherein preferably a position sensor measures the position of the parts of the second adjusting member, Wherein optionally a position sensor measures the position of the first carrier and/or a force sensor measures the force by means of which the first carrier is moved against the second carrier.

Preferably, generally a first and a second adjusting member of a control unit are controlled by the signal of a sensor until the first and second carriers are biased against each other with predetermined force, which acts between the end faces of the material ends fixed. thereto, or until the first and second carriers are moved into a predetermined position relative to each other.

Preferably, the device includes a welding unit, particularly a laser welding device, or a MIG welding device, or a MAC welding device, or a WIG welding device, and the method includes the step of welding the abutting end faces of the material ends, particularly by means of MIG, or MAG, or WIG or laser welding.

BRIEF DESCRIPTION OF THE DRAWINGS

The invention will now be described in more detail in connection with examples of embodiments with reference to the Figures, which schematically show FIG. 1, an embodiment of the device in a first position,
FIG. 2, the embodiment of FIG. 1 in a second position,
FIG. 3, another embodiment of the device in a first position,
FIG. 4, the embodiment of FIG. 3 in a second position,
FIG. 5, a perspective view of an embodiment in a first position,
FIG. 6, a perspective view of an embodiment in a second position,
FIGS. 7 to 14, the preferred sequence of the method, and
FIGS. 15 to 18, the preferred fixing device used in the method.

DETAILED DESCRIPTION

Figure 1:
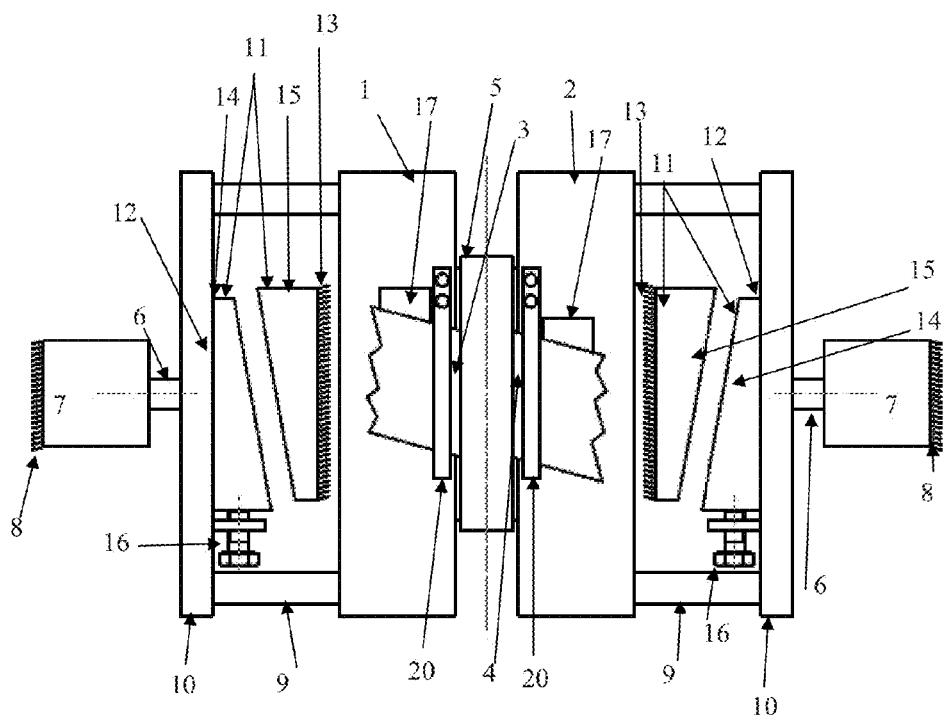

In the Figures, the same reference numerals refer to functionally identical elements. The Figures generally show embodiments in which the first and second adjusting members are each provided with the same functional elements and are slidable relative to each other or apart from each other.

FIG. 1 shows a top view of a device according to the first embodiment, wherein a first carrier 1 is slidable relative to a second carrier 2, and on each carrier 1, 2 is fixed a material by means of a fixing device 20 whose material ends 3, 4 each protrude beyond the carrier 1, 2 in the direction of the oppositely located carriers 2, 1. The material arranged on a carrier 1, 2 rests with a side edge against a stop 17. A cutting device with a cutting element 5 may be guided between the carriers 1, 2 in order to cut the materials protruding beyond the carriers 1, 2 into material ends 3, 4, for example, in end faces which extend parallel or at an acute angle of, for example, up to 15° or 8° relative to the cross section of the material. The device has on each carrier 1, 2 a fixing device 20 by means of which the materials are fixed on the carriers 1, 2 at a distance to the end faces 3, 4 on the carriers 1, 2.

FIG. 1 shows the position in which. the carriers 1, 2 are spaced.apart from each other. The first carrier 1 is connected to the loose end 6 of a first drive 7 whose fixed end 8 is secured. to a base frame. The first carrier 1 is connected to a connecting element 9 which is guided by means of a guiding device. The first carrier 1 is fastened to a connecting element 9 which is guided by means of a guiding device which preferably includes the guide rods or guide rails which are guided, for example, in guides attached to the base frame. The first carrier 11 may be connected by means of a sliding element 10 to the first drive 7. The second adjusting member 11 is with its loose end 12 connected to the first carrier 1, particularly by means of the sliding element 10. The fixed end 13 of the second adjusting member 11 is, in this embodiment, connected to the base frame and is located opposite the fixed end 8 of the drive 7, so that the first and second adjusting members act against each other.

In the position illustrated in FIG. 1, the first drive 7 has moved the first carrier 1 into a position remote from the second. carrier 2, so that the second adjusting member 11 does not influence the positioning of the first carrier 1 in accordance with a preferred embodiment, the second adjusting member 11 has two parts 14, 15 which are separable from each other and which, in the present case, are arranged spaced apart from each other, wherein a loose part 14 is connected to the loose end 12 of the second adjusting member 11 and of which a fixed spot 15 is connected to the fixed end 13 of the second adjusting member 11. Preferably, the material ends 3, 4 are in this position formed by cutting with parallel end faces.

Figure 2:
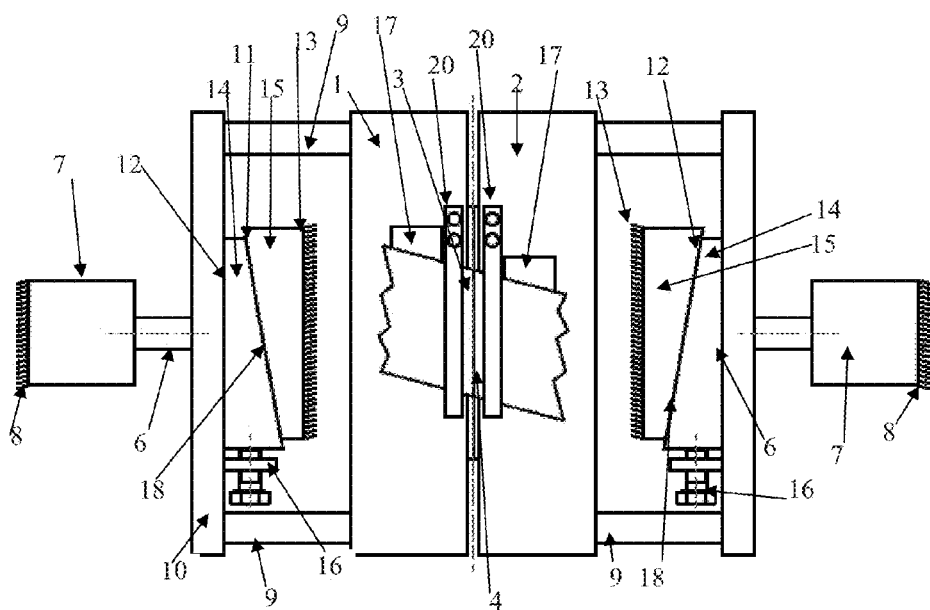

FIG. 2 shows the position in which the first carrier 1 is slid relative to the second carrier 2 by actuating the first drive 7, so that the end faces of the material ends 3, 4 rest against each other. By displacing the first carrier 1, the loose part 14 of the second adjusting member 11 connected to the loose end 6 of the drive 7 is also moved toward its fixed part 15. In the position shown here, the two parts 14, 15 of the second adjusting member 11 are arranged against each other, so that the second adjusting member 11 can be actuated for moving the position of the first carrier 1. Each material remains fixed by the fixing device 20 on a carrier1, 2 and rest with a side edge against the stop 17.

In this embodiment the second adjusting member 11 is a wedge adjustment in which the loose part 14 is a sliding wedge which is movable against the wedge surface of the fixed wedge connected to the base frame. For actuation, the loose part 14 has a drive element 16, for example, an adjusting screw, by means of which the loose part 14 is movable relative to the sliding element 10, which, for example, connects the connecting elements 9 to the first drive 7.

Figure 3:
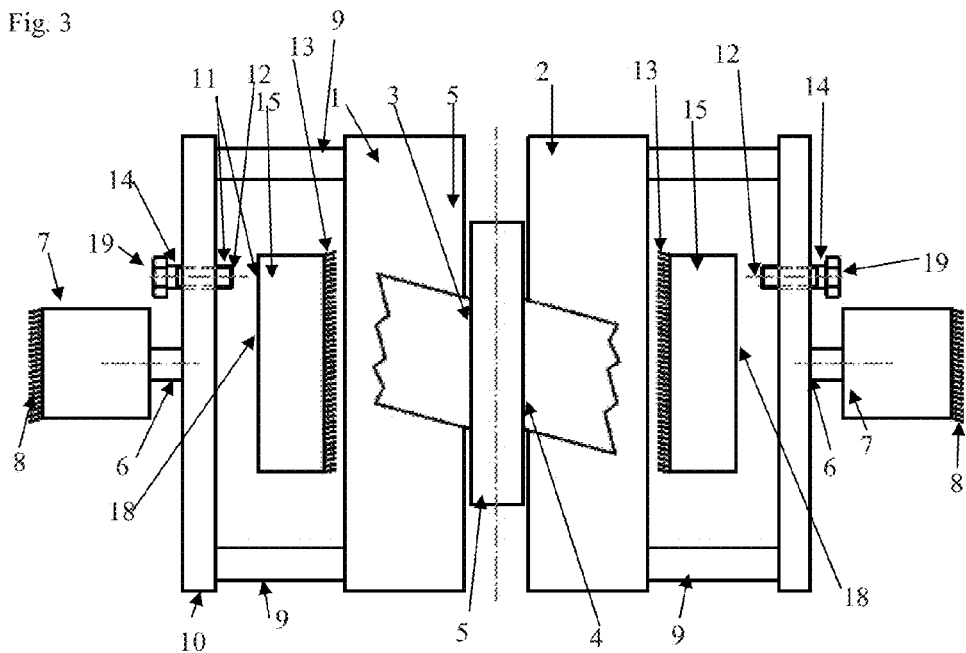

FIG. 3 shows a first embodiment in which the second adjusting member 11 is formed by a stop surface 18 and an adjusting screw 19, one of which, presently the stop surface 18, is connected as the fixed part 15 to the base frame, and the other, presently the adjusting screw 19 as the loose part 14, is mounted so as to be slidable relative to the first drive 7, for example, as shown, by means of a threaded engagement in the sliding element 10. The sliding element 10 connects the loose end 6 of the first adjusting drive 7 to the first carrier 1 in the position illustrated here, in which the first and second carriers 1, 2 are spaced apart from each other, in order particularly for passing the cutting element 5 between the first and second carriers 1, 2, the adjusting screw 19 of the second adjusting element 11 forming the loose part 14 is remote from the stop surface 18 which forms the fixed part 15 of the second adjusting member 11.

When the first carrier 1 is moved toward the second carrier 2, the loose part 14 in the form of the adjusting screw 19 is moved against the fixed part 15 in the form of the stop surface 18. This state is illustrated in FIG. 4 and makes it clear that, in accordance with the invention, the first drive 7 and adjustment member 11 permit a precise positioning of the first carrier 1 relative to the second carrier 2, so that the material ends 3, 4 fixed to the carriers 1, 2 rest against, each other with their cut end faces.

Figure 4:
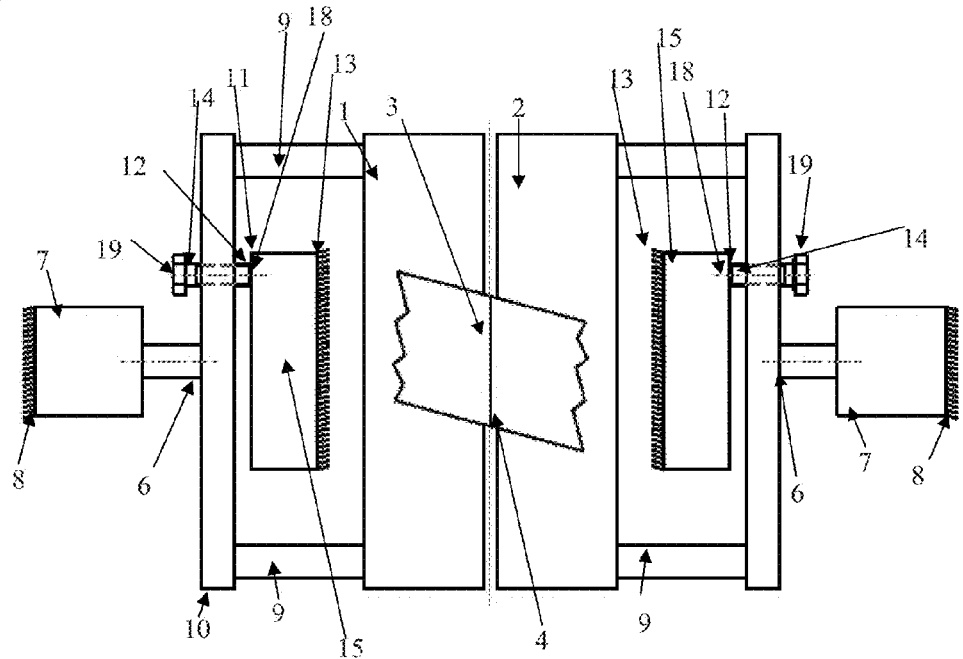

In the position shown in FIGS. 2 and 4, the material ends 3, 4 resting against each other can be welded together.

Figure 5:
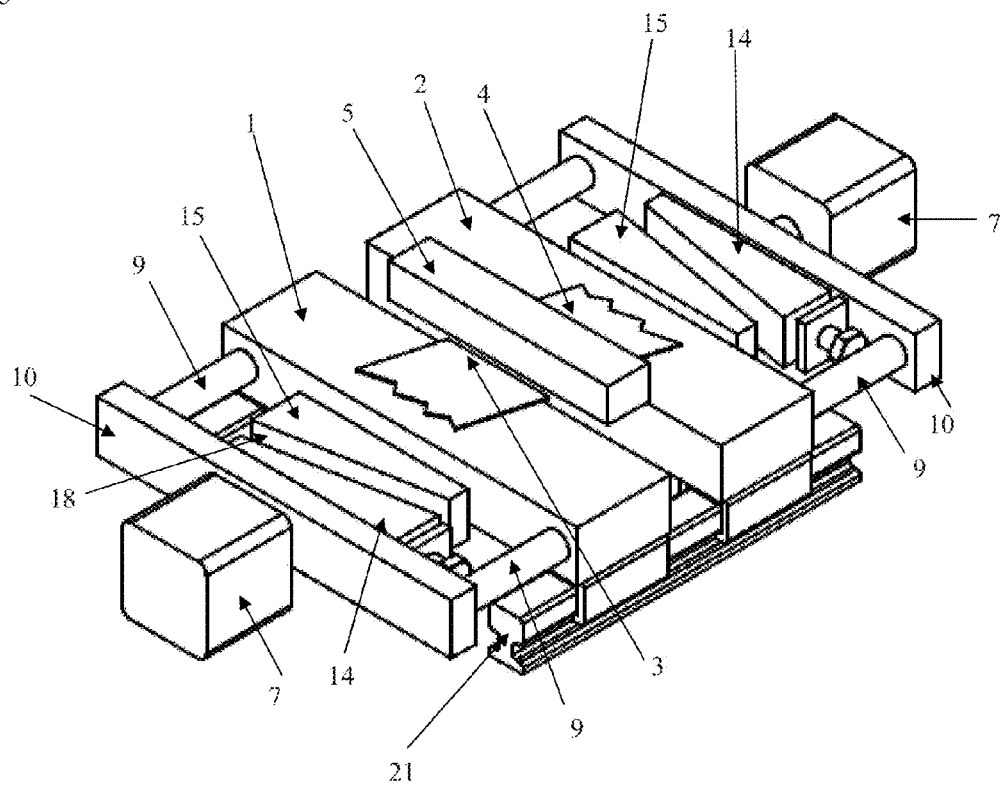

FIG. 5 shows a rail on which the first carrier 1, which is rigidly connected to the connecting element 9 and to the sliding element 10, as an example for a guiding device 21. Preferably, the device has two parallel carriers 1, 2 which are each guided in a guiding device 21. In alternative embodiments in which the first drive 7 includes a displaceable cylinder which includes the loose end 6 of the first drive 7, the cylinder may form the connecting element 9 and the guiding device 21 can be formed by the bore in which the connecting element 9 is guided in the first drive 7.

Figure 6:
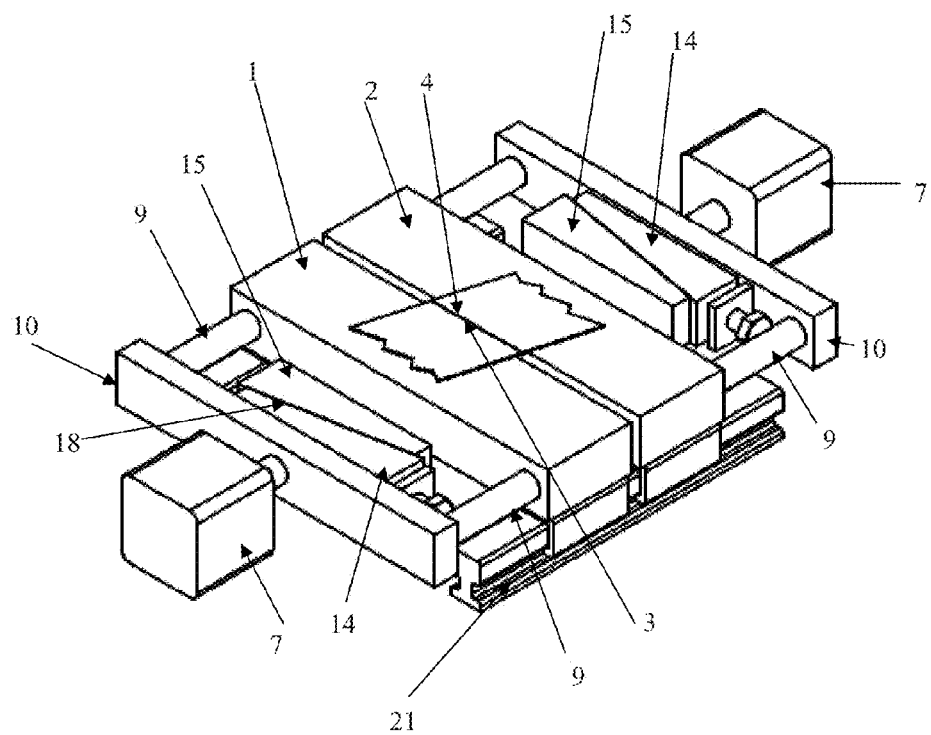

In FIGS. 5 and 6, the fixing devices 20 and the stops 17 are arranged against the material with a side edge, not shown. In the perspective view, it becomes clear that the guiding device 21 contributes to arranging the carriers 1, 2 precisely in a predetermined position in which the cutting element 5 cuts the ends of the end faces whose alignment relative to each other is determined together with the cutting element 5. The guidance of the first carrier 1 relative to the second carrier 2, for example, along the guiding device 21 permits the positionally correct arrangement of the end faces of the material ends 3, 4 relative to each other. The arrangement of these end faces with predetermined positions relative to each other is produced by the movement of the first carrier 1 relative to the second carrier 2 by actuating the first drive 7 and the second adjusting member 11. The preferred method sequence is illustrated step by step in FIGS. 7 through 14. The first embodiment of the device illustrated here includes sliding wedges as the second adjusting member, of which the wedge connected to the loose end is movable perpendicularly of the direction of movement of the first adjusting member. Mounted on this slidable part of the second adjusting member, a position sensor is mounted whose signal indicates the position of the slidable part of this adjusting member and is used preferably for controlling an adjusting drive for this displaceable part.

Figure 7:
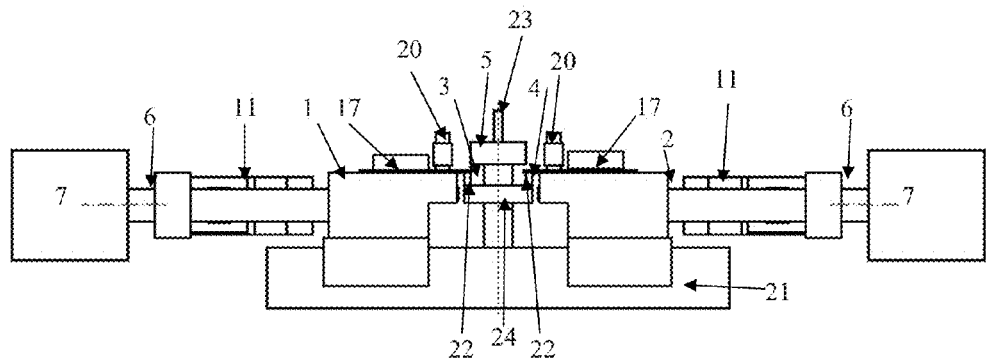

In FIG. 7, the carriers 1, 2 are arranged in the cutting position in which a cutting device, constructed as cutting element 5 with two spaced apart parallel counter knives 22, is positioned between the carriers 1, 2. The edges of the materials rest against stops 18 which protrude beyond the carriers 1, 2. The fixing devices 20 are not yet placed against the carriers 1, 2. As generally preferred, the cutting edges of the counter knives 22 are located in the plane of the carriers 1, 2, so that the counter knives 22 abut against the materials which protrude beyond the carriers 1, 2.

Figure 8:
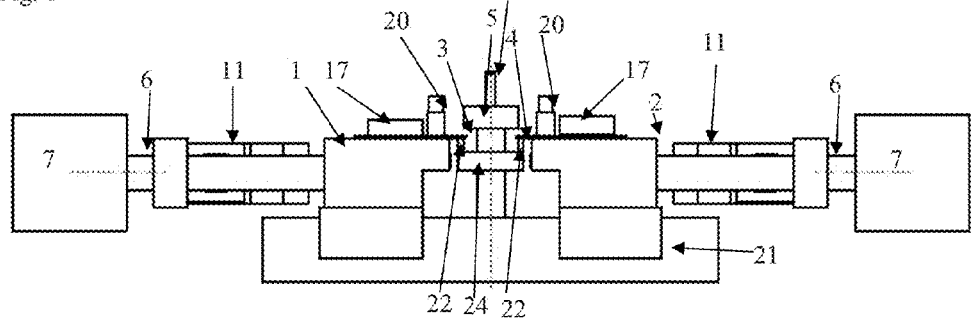

FIG. 8 shows that the fixing devices 20, presently constructed as clamping beams, fix the materials by a parallel movement against the carriers 1, 2.

Figure 9:
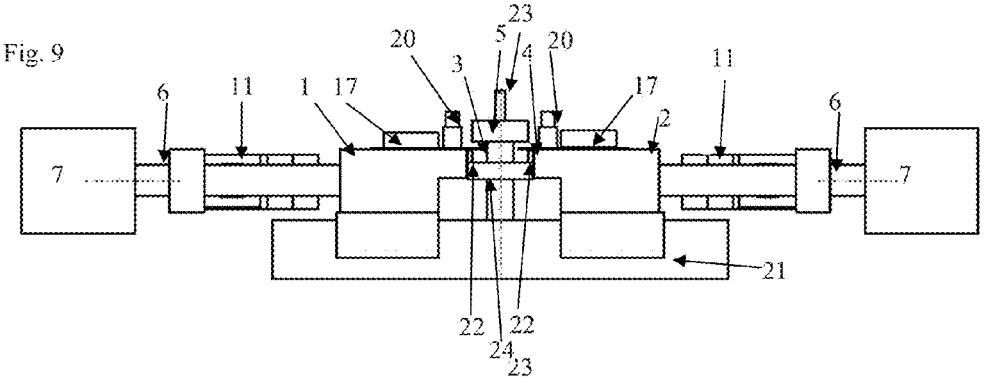

FIG. 9 shows the optional step of placing the carriers 1, 2 in the cutting position by moving them relative to each other.

Figure 10:
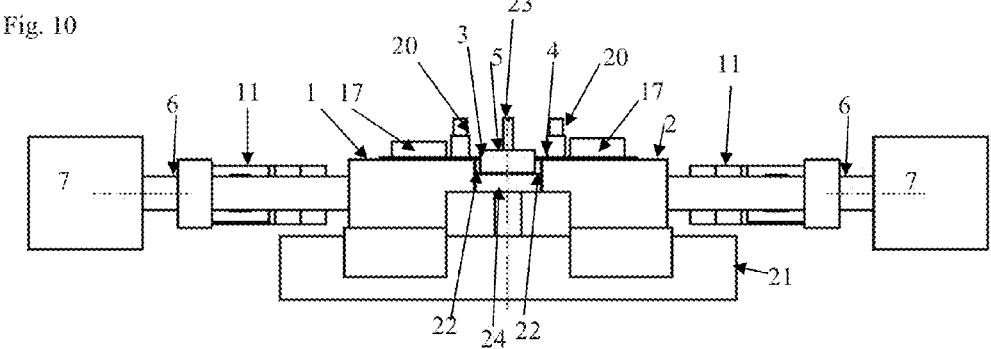

FIG. 10 shows cutting of the material ends 3, 4 into parallel end. faces by moving the cutting element 5 between the counter knives 22. In this position, the end faces of the material ends 3, 4 contact the cutting element 5.

Figure 11:
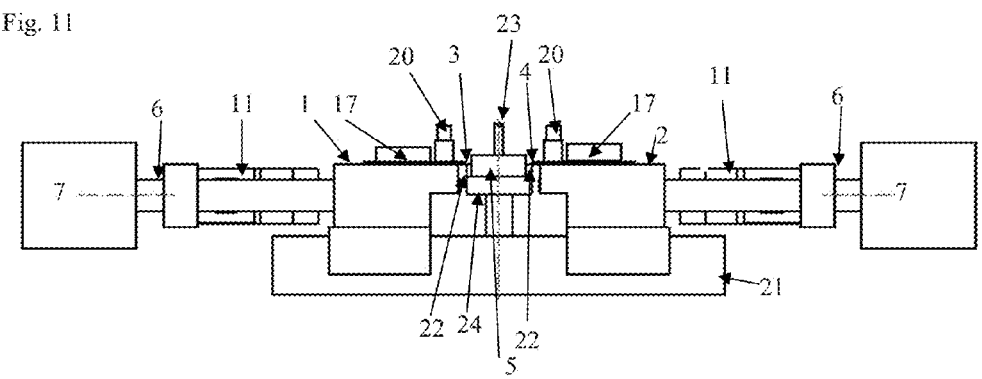

As shown in FIG. 11, it is preferred, for avoiding a mechanical load on the material ends 3, 4 by the cutting element 5, to move the carriers 1, 2 apart from each other until they are moved into a greater spacing than they would assume in the cutting position. This is generally preferred if the counter knives 22 are fixed on their side which is located opposite the cutting element 5, on a knife carrier 24 whose sides, when being positioned into the cutting position between the carriers 1, 2, form stops for the carriers 1, 2. In this embodiment of the device, the knife carrier 24 is arranged with frictional engagement in the cutting position. between. the carriers 1, 2, so that the carriers 1, 2 are movable with a greater spacing, and, together with the cutting element 5, are also movable out of the area of the carriers 1, 2 with the counter knives 22, out of the area between the carriers 1, 2.

Figure 12:
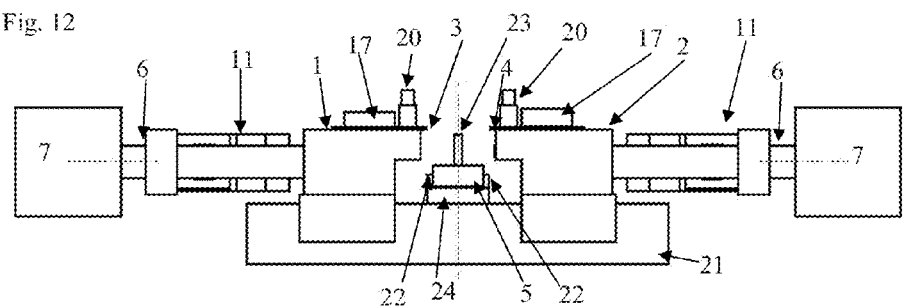

FIG. 12 shows the preferred. lowering of the cutting element 5 in a position underneath the plane of the carriers 1, 2.

In this embodiment of the device, the welding element 5 has on its surface, located opposite the cutting edge, a welding ledge 23.

Figure 13:
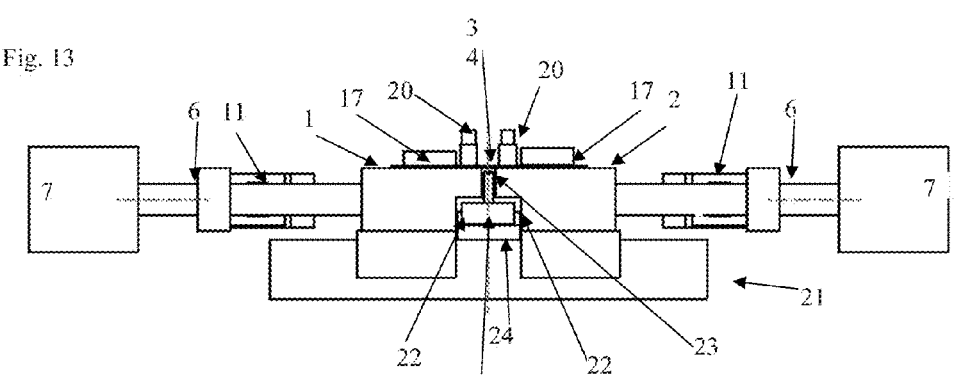

FIG. 13 shows the movement of the carriers 1, 2 relative to each other up into the welding position in which the material ends 3, 4 are positioned at a predetermined distance relative to each other.

Figure 14:
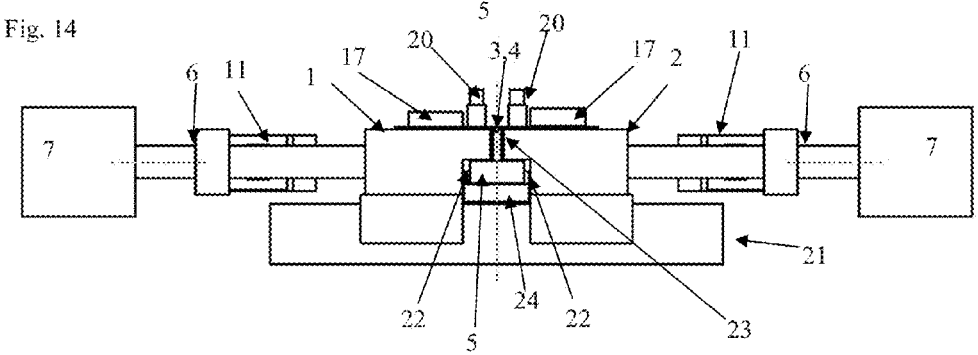

FIG. 14 shows that a welding ledge 23 can be arranged against the material ends 3, 4 which protrude beyond the carriers 1, 2, presently by moving the cutting element 5 up to the placement surfaces of the welding ledge 23, approximately in the plane of the carriers 1, 2, so that the placement surfaces of the welding ledge 23 are arranged parallel to the material ends 3, 4 and the groove of the welding ledge arranged between the placement surfaces extends parallel to the end faces of the material ends 3, 4.

The preferred embodiment of the fixing device 20 shown in FIGS. 15 to 18 is a clamping ledge which is guided at the first end 25 of the clamping ledge on the carrier 1, 2, for example, on a column 26, wherein the column 26 is preferably arranged perpendicularly of the carrier 1, 2. A first clamping drive 27 is arranged at the first end 25 of the clamping ledge, wherein the clamping drive 27 is connected with a first clamping rod 28 to a clamping ledge and a load can be applied against the carrier 1, 2 by means of the clamping ledge. At its second end 29, located opposite the first end 25, the clamping ledge is connectable to the clamping drive 30 by means of a locking device 31 which is releasably engaged in the second clamping rod 32. Locking of the second clamping rod 32 to the clamping ledge in the locking position may, as illustrated in FIG. 16, be effected by arranging the second clamping rod 32 in a recess of the clamping ledge, as illustrated in FIG. 17, by displacing the second clamping rod 32.

The first clamping rod 28 and the second clamping rod 32 are arranged in bores and/or in hydraulic or pneumatic cylinders perpendicularly to the carriers 1, 2. FIG. 18 shows that preferably the first and second clamping drives 27, 30 apply a load against the carriers 1, 2 by means of parallel clamping rods 28, 32 in order to apply a load on the clamping ledge in parallel alignment against the carrier 1, 2. It has been found that, in this manner, a material end 3, 4 can be fixed over the entire width of the material with sufficient clamping force essentially without deformation on the carrier. By lowering the second clamping rod 28, the material can be removed after welding toward the right.

The invention claimed is:

1. Device for holding and connecting two material ends, said device comprising:
    a first carrier and a second carrier which each have a stop protruding beyond the carrier; and a fixing device for a material end,
with a cutting device for cutting the material ends in end aces, and
with a welding device which is configured for welding together the two material ends in the area between the first carrier and the second carrier,
wherein at least the first carrier is slidably guided to the second carrier, and the first carrier is connected to a first drive, and a second adjusting member connected to the first drive for positioning, and wherein the second adjusting member is arranged between the loose end of the first adjusting member and the first carrier.

2. Device according to claim 1, wherein the second carrier is guided so as to be slidable to the first carrier and is connected with the first drive and the second adjusting member connected to the first adjusting member for positioning.

3. Device according to claim 1, wherein the first drive is fastened with its fixed end to a base frame, and is connected with its loose end to a sliding element which is connected to the first carrier.

4. Device according to claim 3, wherein the second adjusting member is connected with its loose end to the sliding element, and the fixed end of the second adjusting member is connected to the base frame.

5. Device according to claim 1, wherein the second adjusting member has at its fixed end a fixed wedge and at its loose end a loose wedge, of which at least one is slidable relative to the other.

6. Device according to claim 1, wherein the second adjusting member includes a stop surface and an adjusting screw guided relative to said stop surface.

7. Device according to claim 1, wherein a sensor, which is configured for determining the positioning of parts of the second adjusting member relative to each other or which is configured for measuring a distance between the first carrier and the second carrier, and a control device which is configured for controlling the second adjusting meniber in dependence on a signal of the sensor.

8. Device according to claim 1, wherein a force sensor which is configured for measuring a force between the first carrier and the second carrier, and a control unit which controls the second adjusting member in dependence on a signal of the force sensor.

9. Device according to claim 3, wherein at least the first carrier is fastened to a connecting element and the first carrier is linearly movably guided on the base frame by a guiding device.

10. Device according to claim 1, wherein each of said first and second carriers has a fixing device which is a clamping beam which, at least over portions, has a clamping surface parallel to a plane of said carrier and which, for each fixing device, is guided at its first end on its respective carrier and is capable of being biased against said respective carrier by means of a first clamping drive, and the clamping beam can, at its second end spaced from the first end by at least a clamping surface, be brought into engagement with a second clamping drive and can be biased against said respective carrier.

11. Device according to Claim 1, wherein the carriers can be positioned in a controlled manner in a cutting position, that a cutting element of the cutting device is movable in the cutting direction between the carriers, that the carriers are movable in a controlled manner at a greater distance than they assume in the cutting position between the carriers, and that the cutting element is movable out of the area between the carriers.

12. Device according to claim 1, wherein the cutting element includes a welding ledge with two placement surfaces aligned parallel to the plane of the carriers and spaced apart by a groove and aligned parallel to the plane of the carriers, wherein the placement surfaces can be positioned adjacent the plane in which the carriers extend.

13. Device according to claim 2, wherein an adjusting member is provided on each carrier for adjusting the size of the gap between the two carriers.

14. Device according to claim 3, wherein the adjusting members are adjustable by screws.

15. Device according to claim 1, wherein a sensor is provided, which is configured for determining the positioning the adjusting members or which is configured for measuring the distance between the first carrier and the second carrier, and a control device which is configured for controlling the adjusting members in dependence on the signal of the sensor.

* * * * *

UNITED STATES PATENT AND TRADEMARK OFFICE
CERTIFICATE OF CORRECTION

PATENT NO. : 8,800,845 B2
APPLICATION NO. : 13/678643
DATED : August 12, 2014
INVENTOR(S) : Schulz et al.

It is certified that error appears in the above-identified patent and that said Letters Patent is hereby corrected as shown below:

In the Claims

Column 13, Claim 1, Line 3: The word "aces" between the words "end" & "and" should read "faces".

Signed and Sealed this
Twenty-fifth Day of November, 2014

Michelle K. Lee
*Deputy Director of the United States Patent and Trademark Office*